(12) United States Patent
Paaske et al.

(10) Patent No.: US 7,191,341 B2
(45) Date of Patent: Mar. 13, 2007

(54) METHODS AND APPARATUS FOR ORDERING DATA IN A CRYPTOGRAPHY ACCELERATOR

(75) Inventors: Tim Paaske, San Jose, CA (US); Mark Buer, Gilbert, AZ (US)

(73) Assignee: Broadcom Corporation, Irvine, CA (US)

(*) Notice: Subject to any disclaimer, the term of this patent is extended or adjusted under 35 U.S.C. 154(b) by 159 days.

(21) Appl. No.: 10/351,258

(22) Filed: Jan. 23, 2003

(65) Prior Publication Data

US 2004/0123121 A1 Jun. 24, 2004

Related U.S. Application Data

(60) Provisional application No. 60/434,457, filed on Dec. 18, 2002.

(51) Int. Cl.
*G06F 17/00* (2006.01)
*G06F 17/30* (2006.01)

(52) U.S. Cl. .................. 713/189; 713/193; 713/150

(58) Field of Classification Search .............. 713/189, 713/193, 150; 370/392; 712/32, 34, 36
See application file for complete search history.

(56) References Cited

U.S. PATENT DOCUMENTS

| RE33,189 E | 3/1990 | Lee et al. |
|---|---|---|
| 5,161,193 A | 11/1992 | Lampson et al. |
| 5,297,206 A | 3/1994 | Orton |
| 5,471,482 A | 11/1995 | Byers et al. |
| 5,734,829 A | 3/1998 | Robinson |
| 5,796,744 A | 8/1998 | Krawczak et al. |
| 5,796,836 A | 8/1998 | Markham |
| 5,867,706 A | 2/1999 | Martin et al. |
| 5,870,474 A | 2/1999 | Wasilewski et al. |
| 5,936,967 A | 8/1999 | Baldwin et al. |
| 5,943,338 A | 8/1999 | Duclos et al. |
| 5,953,416 A | 9/1999 | Hasebe et al. |
| 5,983,350 A | 11/1999 | Minear et al. |
| 6,003,135 A | 12/1999 | Bialick et al. |
| 6,038,551 A | 3/2000 | Barlow et al. |
| 6,101,255 A | 8/2000 | Harrison et al. |

(Continued)

FOREIGN PATENT DOCUMENTS

EP  0876026 A2  11/1998

(Continued)

OTHER PUBLICATIONS

FPGA implementation of MD5 hash algorithm; Deepakumara, J.; Heys, H.M.; Venkatesan, R.; Electrical and Computer Engineering, 2001. Canadian Conference on vol. 2, May 13-16, 2001 pp.: 919-924 vol. 2.*

(Continued)

*Primary Examiner*—David Jung
(74) *Attorney, Agent, or Firm*—Sterne, Kessler, Goldstein & Fox P.L.L.C.

(57) ABSTRACT

Methods and apparatus are provided for sequencing data in a cryptography accelerator with multiple cryptographic processing cores. Cryptographic processing cores are grouped into blocks of cryptographic processing cores to efficiently process received data. Mechanisms are provided to order data sequences at both the cryptographic processing core block level and the cryptographic processing core level.

33 Claims, 10 Drawing Sheets

U.S. PATENT DOCUMENTS

| | | | |
|---|---|---|---|
| 6,111,858 | A | 8/2000 | Greaves et al. |
| 6,115,816 | A | 9/2000 | Davis |
| 6,157,955 | A | 12/2000 | Narad et al. |
| 6,189,100 | B1 | 2/2001 | Barr et al. |
| 6,216,167 | B1 | 4/2001 | Momirov |
| 6,226,710 | B1 | 5/2001 | Melchior |
| 6,269,163 | B1 | 7/2001 | Rivest et al. |
| 6,295,604 | B1 | 9/2001 | Callum |
| 6,320,964 | B1 | 11/2001 | Callum |
| 6,349,405 | B1 | 2/2002 | Welfeld |
| 6,378,072 | B1 | 4/2002 | Collins et al. |
| 6,393,026 | B1 | 5/2002 | Irwin |
| 6,421,730 | B1 | 7/2002 | Narad et al. |
| 6,477,646 | B1 | 11/2002 | Krishna et al. |
| 6,708,273 | B1 | 3/2004 | Ober et al. |
| 6,751,677 | B1* | 6/2004 | Ilnicki et al. ............... 719/316 |
| 6,751,728 | B1 | 6/2004 | Gunter et al. |
| 6,760,444 | B1 | 7/2004 | Leung |
| 6,778,495 | B1* | 8/2004 | Blair ........................ 370/230 |
| 6,831,979 | B2 | 12/2004 | Callum |
| 6,862,278 | B1 | 3/2005 | Chang et al. |
| 6,909,713 | B2 | 6/2005 | Magnussen et al. |
| 6,963,979 | B2 | 11/2005 | Fairclough et al. |
| 6,996,842 | B2 | 2/2006 | Strahm et al. |
| 7,003,118 | B1 | 2/2006 | Yang et al. |
| 7,039,641 | B2 | 5/2006 | Woo |
| 7,055,029 | B2 | 5/2006 | Collins et al. |
| 7,062,657 | B2 | 6/2006 | Law |
| 2002/0001384 | A1 | 1/2002 | Buer et al. |
| 2002/0004904 | A1 | 1/2002 | Blaker et al. |
| 2002/0009076 | A1 | 1/2002 | Engbersen et al. |
| 2002/0039418 | A1 | 4/2002 | Dror et al. |
| 2002/0044649 | A1 | 4/2002 | Gallant et al. |
| 2002/0057796 | A1 | 5/2002 | Lambert et al. |
| 2002/0078342 | A1 | 6/2002 | Matthews, Jr. |
| 2002/0097724 | A1* | 7/2002 | Halme et al. ............... 370/392 |
| 2003/0005144 | A1 | 1/2003 | Engel et al. |
| 2003/0046423 | A1 | 3/2003 | Narad et al. |
| 2004/0039936 | A1 | 2/2004 | Lai |

FOREIGN PATENT DOCUMENTS

| | | |
|---|---|---|
| EP | 1132800 A2 | 9/2001 |
| WO | WO 01/80483 A2 | 10/2001 |
| WO | WO 02/41599 A1 | 5/2002 |

OTHER PUBLICATIONS

Accelerating application-level security protocols; Burnside, M.; Keromytis, A.D.; Networks, 2003. ICON2003. The 11th IEEE International Conference on Sep. 28-Oct. 1, 2003 pp.: 313-318.*

Securing Web servers against insider attack; Jiang, S.; Smith, S.; Minami, K.; Computer Security Applications Conference, 2001. ACSAC 2001. Proceedings 17th Annual Dec. 10-14, 2001 pp.: 265-276.*

"Server ECS", Mar. 9, 1998, [Retreived from Internet Sep. 2, 2004], "http://home.expertcanmore.net/expert/servers.htm".*

IPSec Overview, Jun. 5, 2001, [Retreived from Internet Sep. 2, 2004], "http://forsitesolutions.com/Techstuff/freeswan/inside_overview.html".*

"RFC 2402", Oct. 1998, [Retreived from Internet Sep. 3, 2004], "http://www.ietf.org/rfc/rfc2402.txt?number=2402".*

Secure Products VMS115, VLSI Technology, Inc., Printed in the USA, Document Control:VMS115, VI, 0, Jan. 1999, pp. 1-2.

VMS 115 Data Sheet, VLSI Technology, Inc., a subsidiary of Philips Semiconductors, Revision2:3, Aug. 10, 1999, pp. 1-64.

Data Sheet 7751 Encryption Processor, Network Security Processors, Jun. 1999, pp. 1-84.

Senie, D., "NAT Friendly Application Design Guilelines", Amaranth Networks, Inc., NAT Working Group, Internet-Draft, Sep. 1999, pp. 1-7.

Floyd, S. and Jacobson, V., "Random Early Detection Gateways for Congestion Avoidance",IEEE/ACM *Transactions on Networking*, vol. 1, No. 4, Aug. 1993, pp. 397-413.

Egevang, K. and Francis, P., "The IP Network Address Translator (NAT)", Network Working Group, Request for Comments: 1631, May 1994, pp. 1-10.

Pall, G. S. and Zorn, G., "Microsoft Point-To-Point Encryption (MPPE) Protocol", Microsoft Corporation, Network Working Group, Internet Draft, Updates: RFC 2118, Oct. 1999, pp. 1-12.

Deutsch, P., "Deflate Compressed Data Format Specification Version 1.3", Aladdin Enterprises, Network Working Group, Request for Comments: 1951, May 1996, pp. 1-17.

Kent, S. and Atkinson, R., "IP Authentication Header", Network Working Group, Request for Comments: 2402, printed from http://www.ietf.org/rfc/rfc2402.txt?number=2402, Nov. 1998, 21 pages.

Kent, S. and Atkinson, R., "IP Encapsulating Security Payload (ESP)", Network Working Group, Request for Comments: 2406, printed from http://www.ietf.org/rfc/rfc2406.txt?number=2406, Nov. 1998, 21 pages.

Maughan, D. et al., "Internet Security Association and Key Management Protocol (ISAKMP)", Network Working Group, Request for Comments: 2408, Nov. 1998, pp. 1-20.

Harkins, D. et al., "The Internet Key Exchange (IKE)", Cisco Systems, Network Working Group, Request for Comments: 2409, Nov. 1998, pp. 1-12.

Srisuresh, P., "Security Model with Tunnel-mode IPsec for NAT Domains", Lucent Technologies, Network Working Group, request for Comments: 2709, Oct. 1999, pp. 1-11.

Shenker, S. et al., "Specification of Guaranteed Quality of Service", Network Working Group, Request for Comments: 2212, Sep. 1997, pp. 1-20.

Srisuresh, P. and Holdrege, M., "IP Network Address Translator (NAT) Terminology and Considerations", Lucent Technologies, Network Working Group, Request for Comments: 2663, Aug. 1999, pp. 1-30.

Kent, S. and Atkinson, R., "Security Architecture for the Internet Protocol", Network Working Group, Request for Comments: 2401, Nov. 1998, pp. 1-66.

*Compression for Broadband Data Communications*, BlueSteel Networks, Inc., Sep. 8, 1999, pp. 1-9.

*Securing and Accelerating e-Commerce Transactions*, BlueSteel Networks, Inc., Revision 2.0, Oct. 20, 1999, pp. 1-7.

*Securing Broadband Communications*, by BlueSteel Networks, Inc., Sep. 8, 1999, pp. 1-10.

Keromytis, A.D. et al., "Implementing IPsec",*Global Telecommunications Conference (Globecom)*, IEEE, Nov. 3, 1997, pp. 1949-1952.

Pierson, L.G. et al., "Context-Agile Encryption for High Speed Communication Networks", *Computer Communications Review*, Association for Computing Machinery, vol. 29, No. 1, Jan. 1999, pp. 35-49.

Sholander, P. et al.,. "The Effect of Algorithm-Agile Encryption on ATM Quality of Service", *Global Telecommunications Conference (Globcom)*, IEEE, Nov. 3, 1997, pp. 470-474.

Smirni, E. et al., "Evaluation of Multiprocessor Allocation Policies", Technical Report, Vanderbilt University, Online, 1993, pp. 1-21.

Tarman, T.D. et al., "Algorithm-Agile Encryption in ATM Networks",*IEEE Computer*, Sep. 1998, vol. 31, No. 1, pp. 57-64.

Wassal, A.G. and Hasan, M.A., "A VLSI Architecture for ATM Algorithm-Agile Encryption", *Proceedings Ninth Great Lakes Symposiun on VLSI*, 4-6 Mar.1999, pp. 325-328.

Analog Devices: "Analog Devices and IRE Announce First DSP-Based Internet Security System-On-A-Chip", Analog Devices Press Release, Online, Jan. 19, 1999, pp. 1-3, printed from http://content.analog.com/pressrelease/prdisplay/0.1622.16.00.html.

3Com: "3Com Launches New Era of Network Connectivity", 3Com Press Release, Jun. 14, 1999, pp. 1-3.

*Analog Devices: ADSP2141 SafeNEtDPS User's Manual*, Revision 6, Analog Devices Technical Specifications, Mar. 2000, XP002163401, pp. i-v and 1-82.

Madson, C. and Glenn, R., "RFC 2403-The Use of HMAC-MD5-96 within ESP and AH", IETF Request for Comments: 2403, Nov. 1998, printed from http://csrc.nist.gov/ipsec/papers/rfc2403-hmacmd5.txt, 7 Pages.

Kent, S. and Atkinson, R., "RFC 2406-IP Encapsulating Security Payload (ESP)", IETF Request for Comments: 2406, Nov. 1998, Retrieved from the Internet on Mar. 20, 2001, http://www.faqs.org/rfcs/frc2406.html, 5 Pages.

Sedgewick, R., *Algorithms in C- Third Edition*, 1998, Addison Wesley, XP002163543, pp. 573-608.

Schneider, B., *Applied Cryptography*, Second Edition, 1996, John Wiley & Sons, New York, cited in the application, p. 442, paragraph 18.7- p. 445 (pp. 436-445 enclosed).

Stallings, W., "SHA: The Secure Hash Algorithm, " *Dr. Dobb's Journal*, Apr. 1994, pp. 32 and 34.

European Search Report, form European Patent Appl. No. 03029195.9, 3 pages, dated Nov. 2, 2005.

* cited by examiner

METHODS AND APPARATUS FOR ORDERING DATA IN A CRYPTOGRAPHY ACCELERATOR

CROSS REFERENCE TO RELATED APPLICATIONS

This application claims priority under U.S.C. 119(e) from U.S. Provisional Application No. 60/434,457, filed Dec. 18, 2002, titled Methods And Apparatus For Ordering Data In A Cryptography Accelerator, by Tim Paaske And Mark Buer, the entirety of which is incorporated by reference for all purposes. The present application is also related to concurrently filed U.S. patent application Ser. No. 10/350,922 entitled Cryptography Accelerator Data Routing Unit, by Mark Buer and Don Matthews, U.S. patent application Ser. No. 10/350,907, entitled Cryptography Accelerator Input Interface Data Handling, by Mark Buer and Don Matthews, and U.S. patent application Ser. No. 10/350,902, entitled Cryptography Accelerator Interface Decoupling From Cryptography Processing Cores, by Mark Buer and Don Matthews, the entireties of which are incorporated by reference for all purposes.

BACKGROUND OF THE INVENTION

1. Field of the Invention

The present application relates to cryptography accelerators. More specifically, the present application relates to methods and apparatus for data handling in cryptography accelerators.

2. Description of Related Art

Conventional cryptography accelerators include a variety of mechanisms for managing the exchange of data with external devices. In many conventional implementations, limited data handling mechanisms are provided for cryptography accelerators with particular cryptographic processing core configurations.

Mechanisms for performing cryptographic operations are described in Applied Cryptography, Bruce Schneier, John Wiley & Sons, Inc. (ISBN 0471128457), incorporated by reference in its entirety for all purposes. However, having cryptography accelerators with multiple cryptographic processing cores presents a variety of challenges including data handling challenges and inefficiencies.

It is therefore desirable to provide methods and apparatus for improving data handling with respect to some or all of the performance limitations noted above.

SUMMARY OF THE INVENTION

Methods and apparatus are provided for sequencing data in a cryptography accelerator with multiple cryptographic processing cores. Cryptographic processing cores are grouped into blocks of cryptographic processing cores to efficiently process received data. Mechanisms are provided to order data sequences at both the cryptographic processing core block level and the cryptographic processing core level.

In one embodiment, a method for sequencing data in a cryptography accelerator is provided. A plurality of data sequences is received. The plurality of data sequences are provided with load distribution tags identifying the order in which the plurality of data sequences were received at a load distributor in a cryptography accelerator. Security association information associated with the plurality of data sequences is identified. The plurality of data sequences are provided with routing tags identifying the order in which the plurality of data sequences were received at a packet distribution unit. The plurality of data sequences are cryptographically processed using a plurality of cryptographic processing cores.

In another embodiment, a cryptography accelerator is provided. The cryptography accelerator includes a data input unit, a first cryptographic processing block, a second cryptographic processing block, a first packet convergence unit, and a data routing unit. A data input unit is configured to receive data sequences from an external entity. A first cryptographic processing block includes a first plurality of cryptographic processing cores. A second cryptographic processing block comprising a second plurality of cryptographic processing cores. A first packet convergence unit is associated with the first cryptographic processing block. The first packet convergence unit is configured to arrange in order data sequences processed by the first plurality of cryptographic processing cores. A data routing unit is configured to arrange in order data sequences from the first and second cryptographic processing blocks.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present application relates to implementing a cryptography accelerator. More specifically, the present application relates to methods and apparatus for providing a cryptography accelerator with multiple cryptographic processing cores.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of a multiple port cryptography accelerator with multiple cores for performing particular cryptographic operations. However, it should be noted that the techniques of the present invention can be applied to a variety of different chip architectures that perform authentication and encryption operations in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
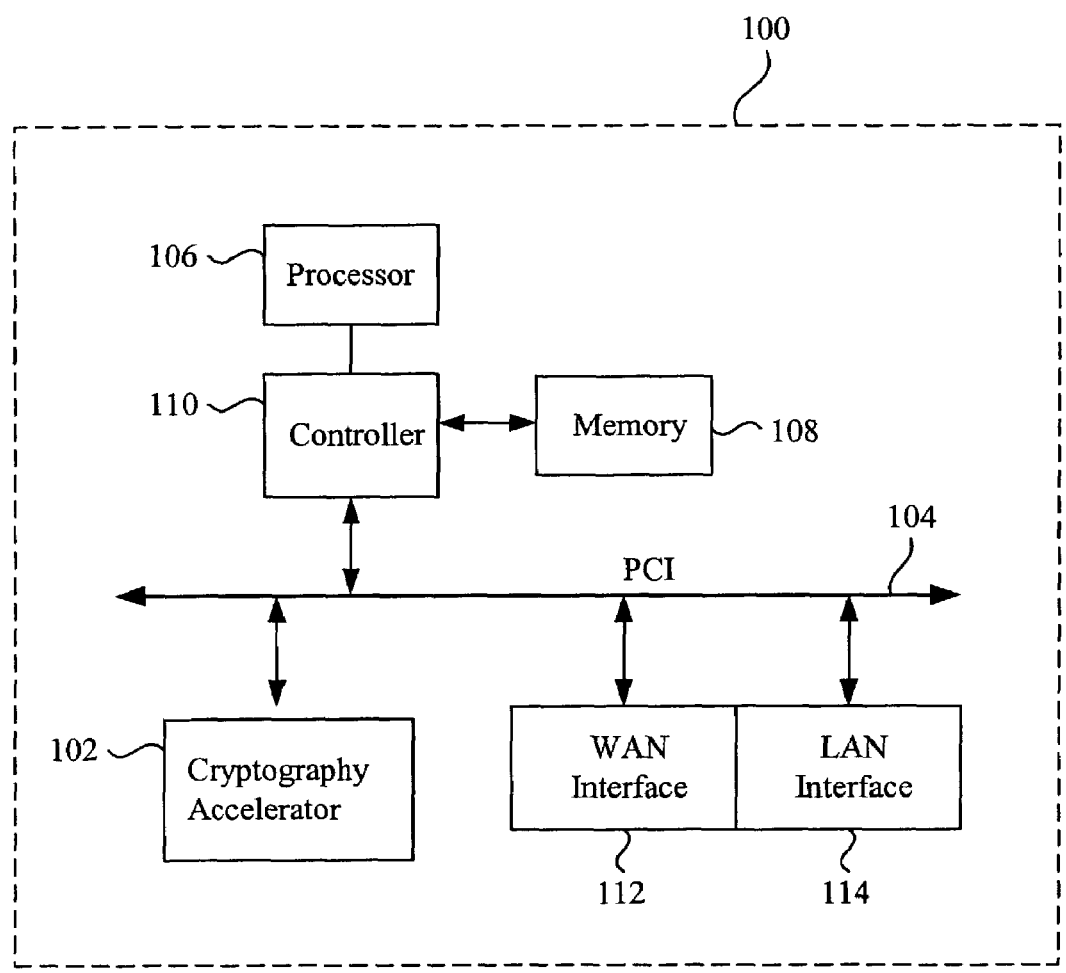
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. Any logic, mechanism, or device operable to perform encryption, decryption, and/or authentication operations is referred to herein as a cryptography accelerator. In the described embodiment, the cryptography accelerator 102 is connected to a bus 104 such as a PCI bus via a standard on-chip PCI interface. The processing system 100 includes a processing unit 106 and a system memory unit 108. In typical implementations, the cryptography accelerator 102 includes multiple ports used for communication with external devices such as the processing unit 106 and system memory unit 108. The processing unit 106 and the system memory unit 108 are coupled to the system bus 104 via a bridge and memory controller 110.

Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets to allow automatic encryption and authentication processing.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or ARC Cores of San Jose, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as Secure Sockets Layer/Transport Layer Security (SSL/TLS), which provide application-transparent encryption and authentication services for network traffic. Network security standards such as SSL/TLS provide authentication through the use of hash algorithms and encryption through the use of encryption algorithms. Two commonly used hash algorithms are MD5 and the Secure Hash algorithm (SHA-1). Other hash algorithms such as MD4 and MD2 are also available. Two commonly used encryption algorithms are DES and RC4. Other encryption algorithms such as triple DES are also available. Authentication and encryption algorithms are described in Applied Cryptography, Bruce Schneier, John Wiley & Sons, Inc. (ISBN 0471128457), incorporated by reference in its entirety for all purposes.

Figure 2:
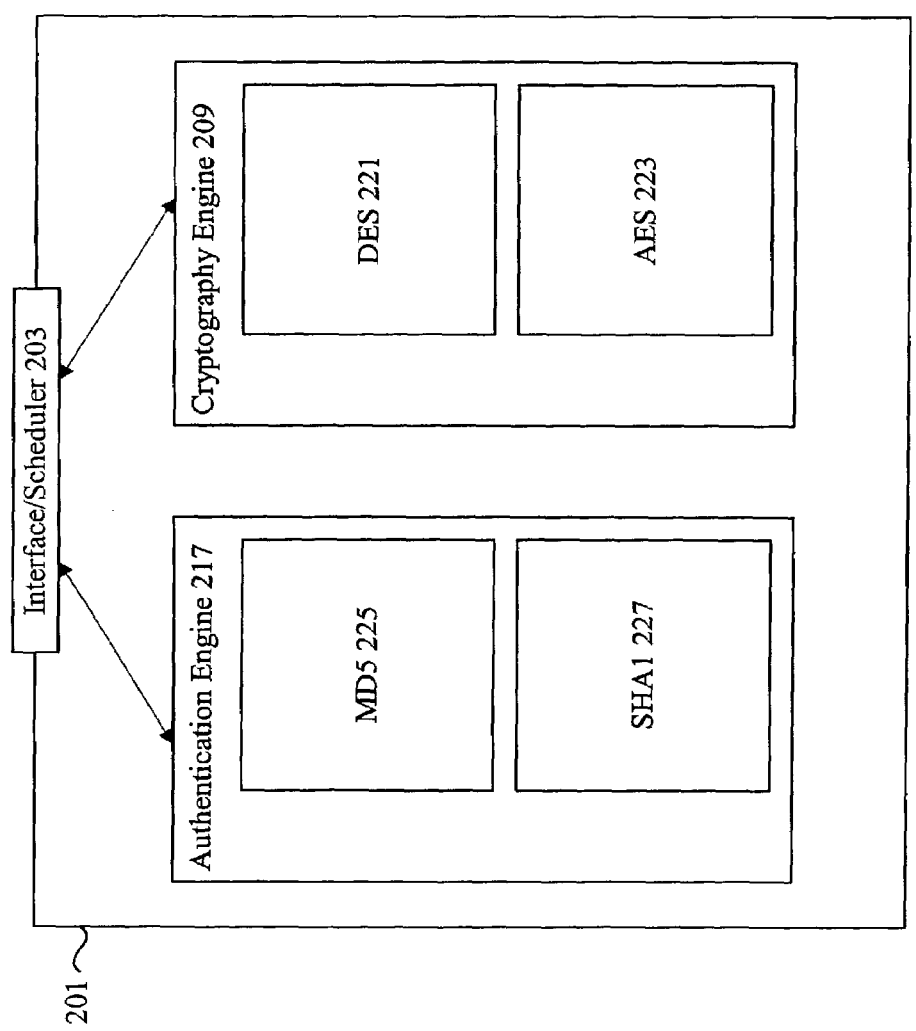
FIG. 2 is a diagrammatic representation of a cryptography accelerator containing processing cores and interfaces.

FIG. 2 is a diagrammatic representation of one example of a cryptography accelerator 201. The cryptography accelerator 201 includes an input interface 203 connected to a host such as an external processor. According to various embodiments, the interface 203 receives information from the host for processing and sends information to the host when processing is completed. In typical implementations, the input interface can include multiple ports. Each of the different ports may be used to provide a different interface to an external resource such as a host or network card. In one example, a first port is a streaming interface port configured to allow the input of data streams for processing in the cryptographic processing cores. A second port is a Gigabit MAC (media access control) interface configured to receive individual packets.

The various ports pass data to the cryptographic processing core circuitry 251 to perform operations such as encryption, decryption, and authentication operations on the received data. The output interface 291 takes processed data from the cryptographic processing core circuitry 251 and provides the processed data to various external entities. The output interface 291 typically includes multiple ports.

Figure 3:
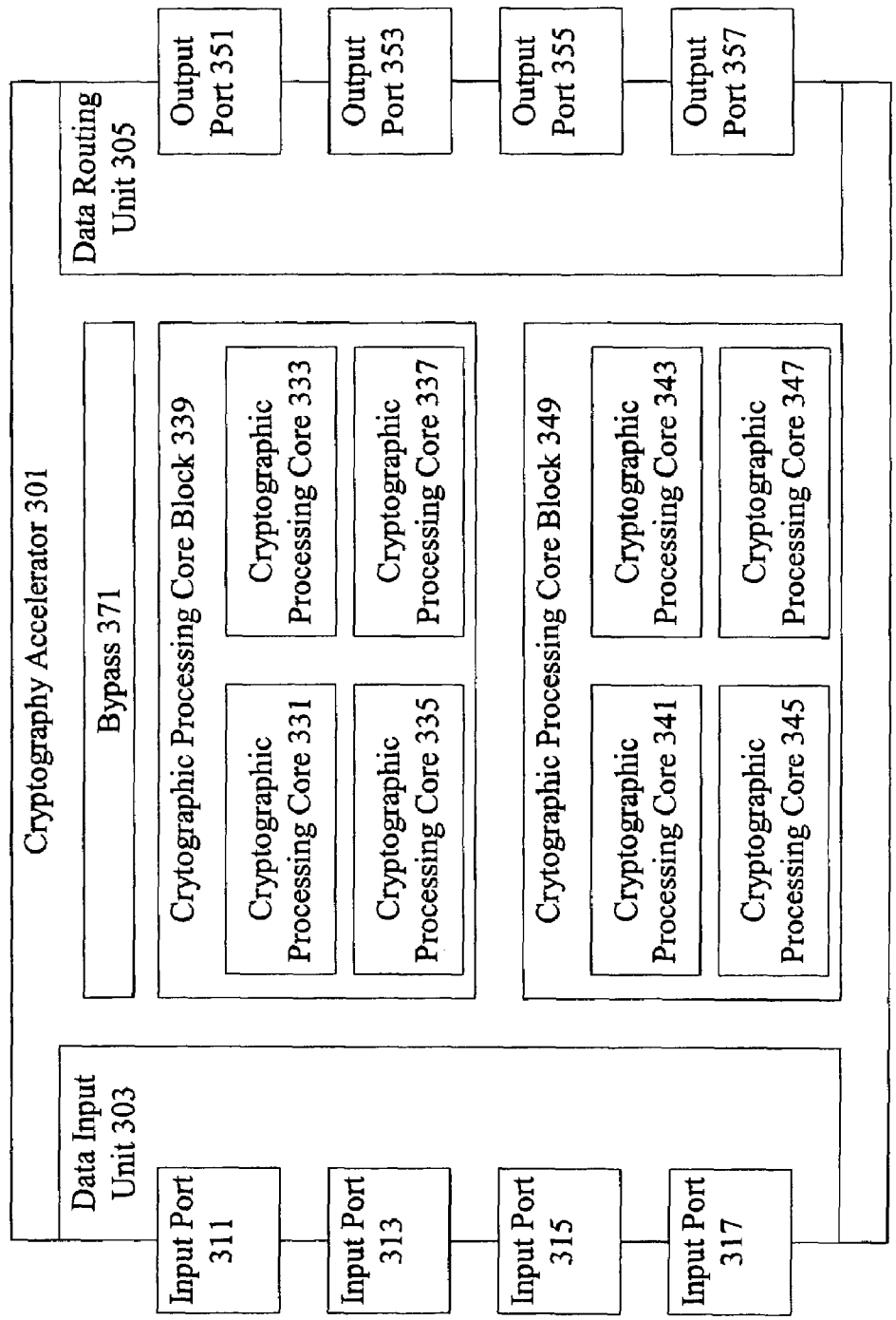
FIG. 3 is a diagrammatic representation of a cryptography accelerator having a data interface unit, a data routing unit, and multiple cryptographic processing core blocks.

FIG. 3 is a diagrammatic representation of one example of a cryptography accelerator having multiple cryptographic processing cores. The cryptography accelerator 301 includes a data input unit 303 having multiple input ports 311, 313, 315, and 317. In one example, the data input unit 303 takes data in a round robin fashion from each of the four input ports. In one embodiment, the data input unit 303 can then allocate space in a shared input buffer, for each of the received packets. Information associated with the data, such as data length, packet type, start of packet information, end of packet information, and ordering information is also maintained based on the associated input port identified.

Using information associated with the data, the data input unit 305 can then determine how the data should be processed. In one example, the data may require no processing at all, and may be forwarded to a bypass line 371 to allow output of the data from the cryptography accelerator 301 with substantially no cryptographic operations performed on the data. In typical implementations, the cryptography accelerator 102 includes multiple ports used for communication with external devices such as the processing unit 106 and system memory unit 108.

In a similar manner, the data input unit 303 may determine that the data from one of the input ports should be processed using one of the cryptographic processing core data paths 331, 333, 335, 337, 341, 343, 345, and 347. Any mechanism shared by various input ports to buffer and distribute data to various cryptographic processing core blocks is referred to herein as a data input unit. According to various embodiments, the data input unit 303 determines whether to forward data to cryptographic processing core blocks 339 or 349 based on load information.

The data input unit 303 is configurable to provide buffering for all the different data in the device. In some embodiments, the cryptography accelerator 301 also includes a data routing unit 305 having multiple output ports 351, 353, 355, and 357. Any mechanism shared by output ports to buffer cryptographically processed data and sequence received data is referred to herein as a data routing unit. According to various embodiments, the data routing unit manages the ordering and delay of the data targeted at the various output ports.

In one example, data sequences are received by input port 311 at the data input unit 303. The data input unit 303 can then determine which cryptographic processing core block will handle the data sequences. In some examples, each data sequence is a packet, although the data sequences do not necessarily have to be packets. The data input unit 303 may determine that a cryptographic processing core block 339 is capable of processing the first and second received data sequences based on a load determination. However, when the data input unit 303 receives a third data sequence to input port 311, it determines based on load that the cryptographic processing core block 349 should process the third data sequence. In some examples, the first two data sequences may be processed and output to the data routing unit before the third data sequence. However, circumstances may arise when a third data sequence is processed by a cryptographic processing core block 349 and output to the data routing unit 305 before the first and second data sequences are output to the data routing unit 305.

Consequently, mechanisms are provided for a data routing unit 305 to order the data sequences. In one example, load distribution tags are attached to each data sequence by a data input unit 303. The load distribution tag includes a sequence number that allows a data routing unit 305 to order the data sequences received through input port 311. Any tag used to order cryptographically processed data sent through different cryptographic processing core blocks is referred to herein as a load distribution tag.

According to various embodiments, the techniques of the present invention provide mechanisms for both strict ordering and source ordering. In strict ordering mode, the data input unit is configured to distribute packets received from any input port to any of the cryptographic processing core blocks. Any block that includes multiple cryptographic processing cores is referred to herein as a cryptographic core processing block. The data input unit selects the cryptographic processing core blocks using some mechanism such as load balancing or round robin.

In source ordering mode, the data input unit is configured to map input ports to particular cryptographic processing core blocks. In one example, the source ordering mode forces the data input unit 303 to forward all packets received through input port 311 to the cryptographic processing core block 339. Consequently, in source ordering mode, data sequences from input port 311 forwarded to an output port from the cryptographic processing core block 339 are already in order. In source ordering mode, the data routing unit 305 can be configured to disregard the load distribution tag. Alternatively, the data input unit 303 may not even add a load distribution tag to packets from ports configured to use source ordering.

Figure 4:
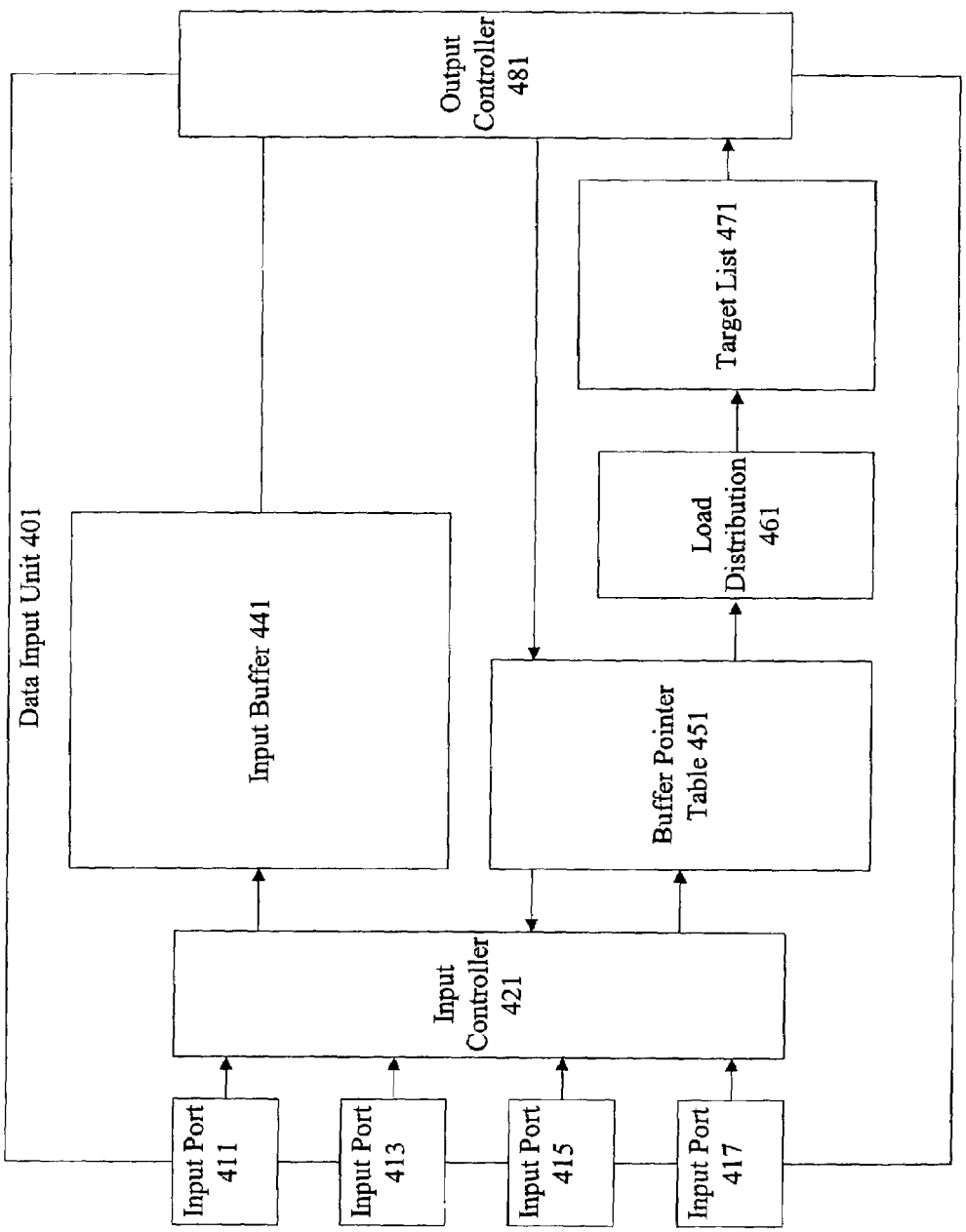
FIG. 4 is a diagrammatic representation showing a data input unit.

FIG. 4 is a diagrammatic representation showing more detail on one example of a mechanism in a data input unit 401 that can be used to add a load distribution tag. Data input unit 401 includes input ports 411, 413, 415, and 417. In one embodiment, the input controller 421 takes data from each of the four input ports in round robin fashion. The input controller 421 determines if any input buffer space is available for a particular port. In one example, input controller 421 determines if buffer space is available in input buffer 441 by examining buffer pointer table 451. Buffer pointer table 451 includes a list of pointers each associated with a block of memory in input buffer 441. In one instance, each pointer in the buffer pointer table 451 references a 128 byte chunk of memory in the input buffer 441. Consequently, it should be noted that the input buffer 441 does not have to be physically divided amongst the input ports in order to dynamically allocate buffer space for each of the various input ports. Although physically allocating the input buffer 441 to the various input ports is one possible mechanism for providing an allocable shared resource, the techniques of the present invention also provide for allocation of pointers to the input buffer 441.

According to various embodiments, blocks of pointers in the buffer pointer table 451 are allocated to the various input ports. The input controller 421 determines if any pointer associated with the input port is available. If a pointer associated with the input port is free or available, the data in the input port is forwarded to input buffer 441 and the pointer is assigned to the packet. In one implementation, an entry in the buffer pointer table 451 lists the free pointers available and their associated input ports. In another implementation, each entry is associated with a flag indicating if the pointer is being used and what port the pointer is associated with. If no pointers associated with the input port are available, the input controller does not hold data from the input port, as all buffer space allocated to the input port has been consumed. Any mechanism for tracking packets in a shared resource where the packets are destined for cryptographic processing is referred to herein as a buffer pointer table. Any mechanism for allocating the pointers in the buffer pointer table to various packets is referred to herein as an input controller 421.

When the input controller 421 has assigned data pointers from the buffer pointer table 451, a load distribution unit 461 can select data from the buffer pointer table entries to forward to cryptographic processing core blocks. According to various embodiments, load distribution unit 461 can attach load distribution tags to the data referenced by the buffer pointer table 451 using a variety of mechanisms. In one example, the load distribution unit 461 attaches a sequence number for the packet from the particular session. When a new session is initiated, the sequence number is reset to zero.

As load distribution tags are attached, mechanisms for obtaining security association information can also be performed. Data destined for cryptographic processing is often processed based on information associated with the packet. In one example, a packet is processed after obtaining security association information associated with the packet. The security association information includes keys such as session keys, initialization vectors, and the particular algorithms needed to process the data. Security association data is often determined using combinations of source and destination addresses and source and destination port numbers. For example, a packet with a source of A and a destination of B may be determined to need triple DES processing, MD5 authentication, and a session key available to the cryptographic processing core from a particular memory address. The load distribution unit 461 identifies information needed for cryptographic processing of the data and provides a pointer to the information. In many instances, the pointer is a pointer to the header of a packet stored in the input buffer 441.

According to various embodiments, the load distribution unit 461 passes information including a load distribution tag to target list 471. In one example, target list 471 includes multiple lists, each list associated with a cryptographic processing core block. One list may be associated with bypass data that should be passed through the cryptography accelerator substantially without processing. Other lists may be associated with public key operation data paths. In one example, a modular exponentiation unit list is provided for performing modulus operations on data in the input buffer 441. Still other lists include pointers to packets in buffer memory 441 requiring processing by one of the cryptographic accelerator cores. The data pointer lists are associated with a header pointer list that identifies how to derive information such as security association information for processing the data corresponding to the pointers in the data pointer list. The output controller 481 is responsible for forwarding data associated with the pointers in the target list to the various data paths. Typically, data associated with each of the lists in the target list 471 is pulled in round-robin fashion. In one example data associated with each list gets the same amount of bandwidth out of the input buffer 441.

Figure 5:
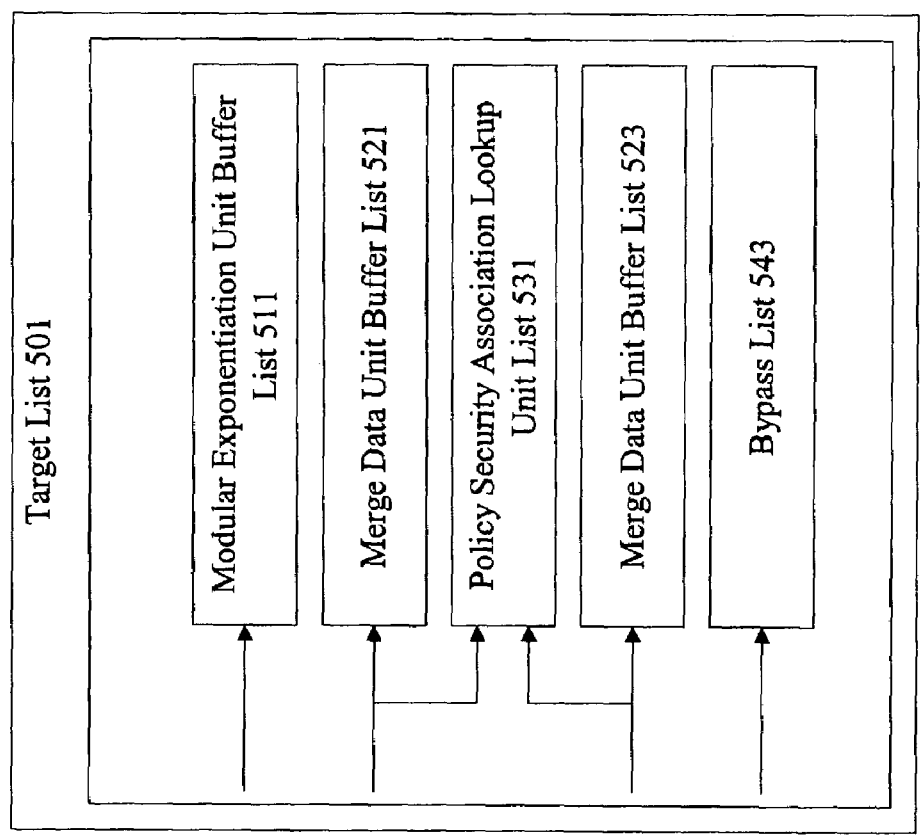
FIG. 5 is a diagrammatic representation showing a target list.

FIG. 5 is a diagrammatic representation of a target list. According to various embodiments, target list 501 includes multiple lists associated with various data paths. In one example, target list 501 includes a bypass list 543 associated with data to be passed through the cryptography accelerator without cryptographic processing. A modular exponentiation buffer list 511 is provided for public key processing of data. According to various embodiments, merge data unit buffer list 521 and merge data unit buffer list 523 are provided for data to be forwarded to cryptographic processing cores. Merge data unit buffer list 521 and 523 are associated with pointers to data that will be merged with security association information before cryptographic processing is performed.

Consequently, merge data unit buffer lists 521 and 523 are linked to policy security association lookup unit header list 531. When a pointer is provided to merge data unit buffer list 521, a pointer is also provided to policy security association lookup unit header list 531. The merge data unit buffer list 521 pointer allows later combination of data with security association information extracted from a policy security association lookup unit. When the data is combined with the security association information, the data can be processed using one of a number of cryptographic processing cores.

Figure 6:
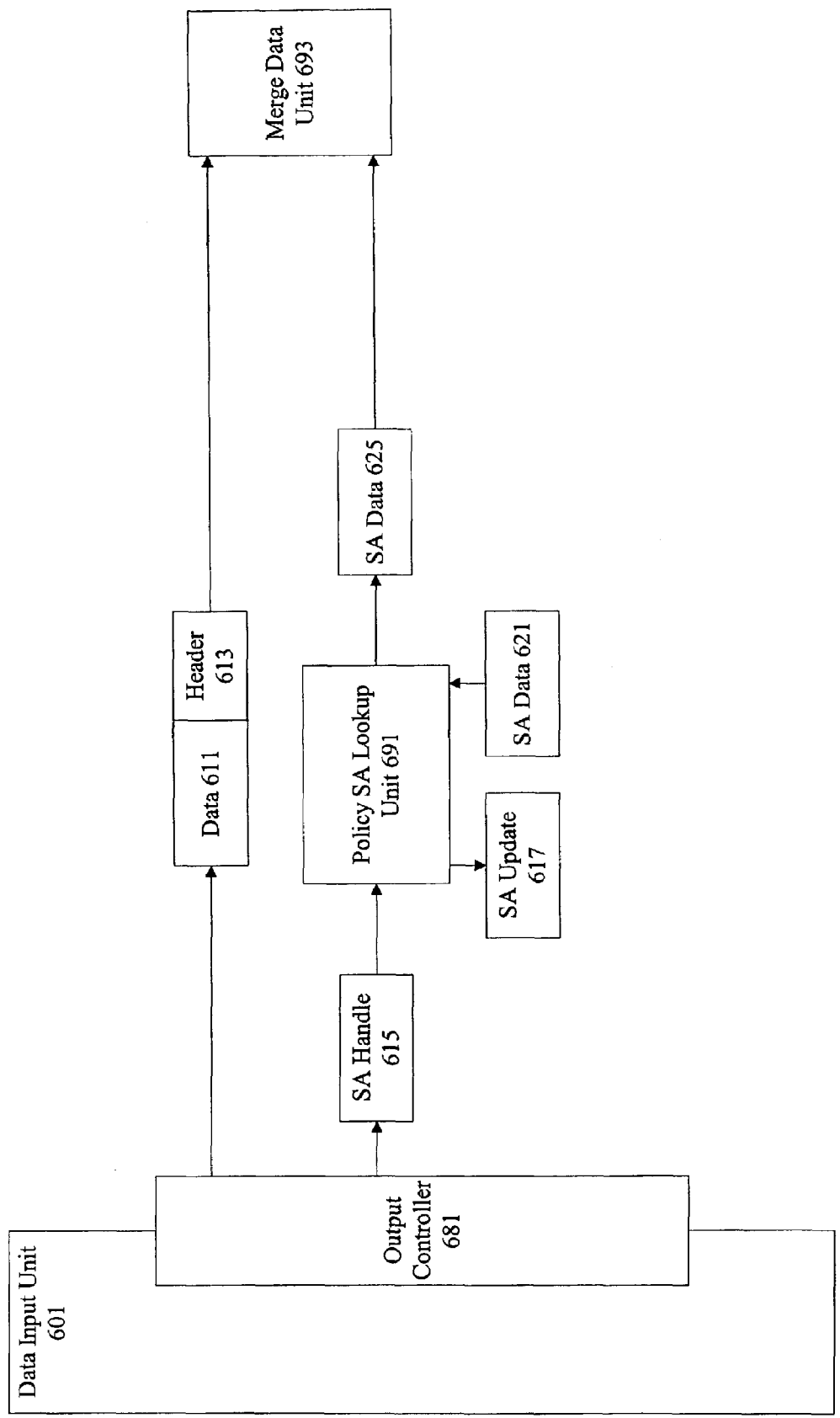
FIG. 6 is a diagrammatic representation showing data handling associated with a policy security association lookup unit.

FIG. 6 is a diagrammatic representation of data passed to a merge data unit. According to various embodiments, the output controller 681 associated with the data input unit 601 provides data 611 and 613 to a merge data unit 693. However, before the data 611 and header 613 can be processed using one of a number of cryptographic processing cores, the data typically is combined with security association information. According to various embodiments, the security association information is derived by a policy security association lookup unit. In one embodiment, the policy security association lookup unit reads information from memory and prepends information to data 611 and header 613. The location in memory of the security association data structure can be specified directly or by identifiers passed by the output controller 681. In one example the output controller 681 passes a security association handle 615 to the policy security association lookup unit 691.

In one example, the policy security association lookup unit 691 uses the information in the security association handle 615 to identify security association information. The information identified can be used for both inbound and outbound packets to allow the packets to be classified into flows. In one instance, the security association handle 615 includes up to 2k of the header of the associated packet. The policy security association lookup unit then issues a security association update 617 to modify data such as sequence numbers associated with a flow.

The policy security association lookup unit 691 acquires security association data 621 and passes the security association data 625 to a merge data unit 693. The merge data unit 693 combines the security association data 623 with the data 611 and header 613. It should be noted that the policy security association lookup unit processing may vary depending on whether the packet is an inbound packet or an outbound packet. For an outbound packet, the policy security association lookup unit may also be responsible for determining header information such as outer IP header information. For an inbound packet, the outer IP header information is included in the data 611 and header information 613. Various types of error checking can also be performed by the policy security association lookup unit 691 to determine that the flow referenced by a security association handle 615 is a valid one.

It should be noted that each merge data unit 693 can then pass the combined data to one of multiple cryptography processing core blocks. In one example, two merge data units are provided in a cryptography accelerator having a data input unit and eight processing cores. The two merge data units are also associated with a single policy security association lookup unit. Each merge data is coupled to two cryptographic processing blocks each including four cryptographic cores. In some examples, each merge data unit would select one of the four cryptographic processing cores to handle data based on load.

Figure 7:
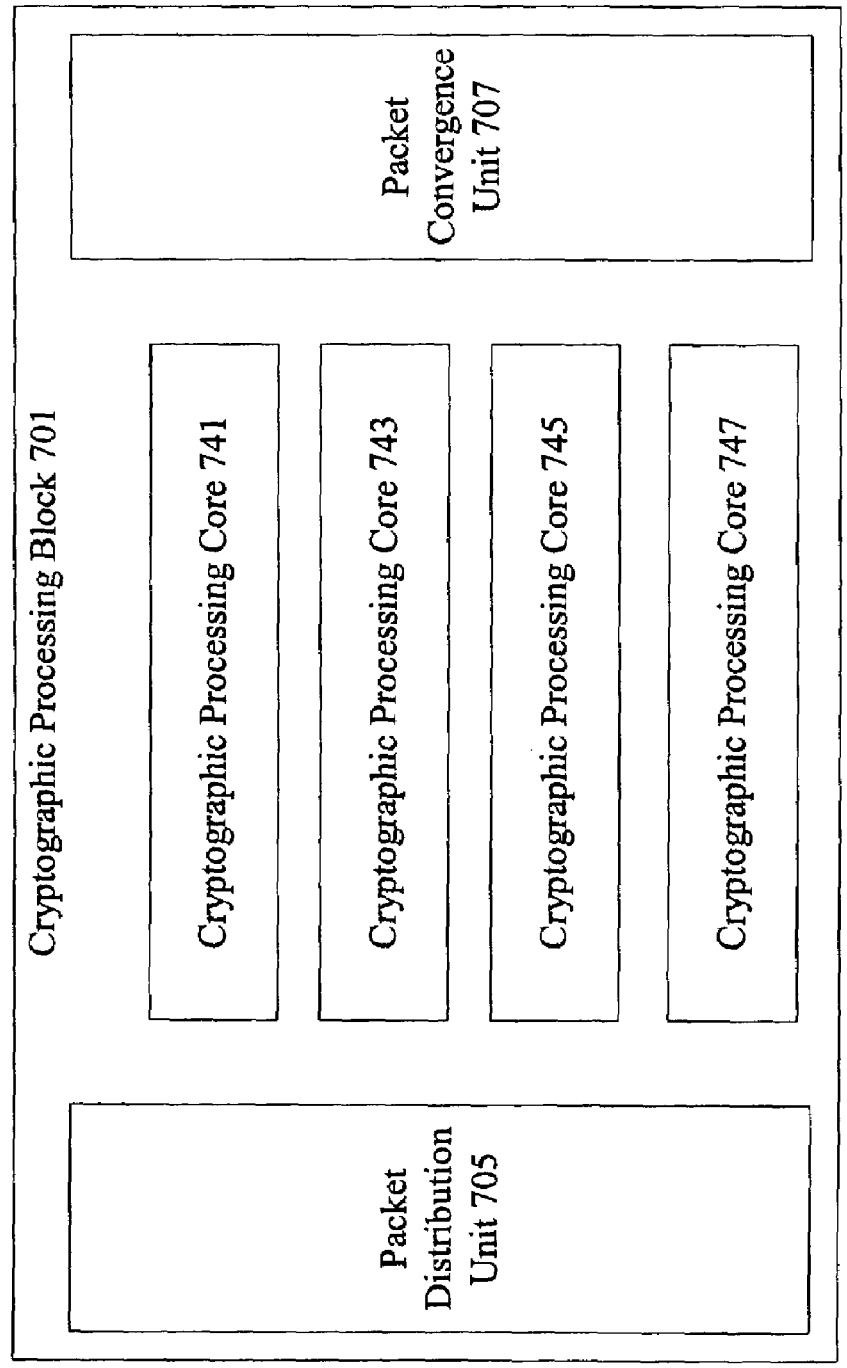
FIG. 7 is a diagrammatic representation showing a cryptographic processing core block.

FIG. 7 is a diagrammatic representation a cryptographic processing block that receives data sequences typically after security association information is obtained. In typical implementations, a cryptographic processing block 701 is one of multiple cryptographic processing blocks in a cryptography accelerator. The cryptographic processing block 701 includes multiple cryptographic processing cores 741, 743, 745, and 747 capable of performing encryption, decryption, and authentication processing on a packet. In one example, each cryptographic processing core is capable of decrypting an encrypted data sequence into plain text. As noted above, the load distribution tag allows ordering of packets sent to different cryptographic processing blocks. In one example, the load distribution tags allow a first data sequence processed at a first cryptographic processing block and a second data sequence processed at a second cryptographic processing block to be ordered correctly before being forwarded to an output port even if the second data sequence has processing completed first. Using two different types of tags allows efficient handling of large and small packets while efficiently managing input buffer size. Not using the tags of the present invention would entail large buffers associated with each of the cryptographic processing cores.

The data routing unit can be configured to wait until the first data sequence has processing completed. However, data sequences arriving at a particular cryptographic processing block may also be processed by different cryptographic processing cores. The packet distribution unit 705 in a cryptographic processing block 701 may distribute received packets to the different cryptographic processing cores again based on factors such as load balancing in a manner similar to the way data sequences were distributed to different cryptographic processing blocks. As noted above, each cryptographic processing block includes multiple cryptographic processing cores.

In one example, each data sequence is a packet. A packet distribution unit 705 forwards a first packet to a first cryptographic processing core 741, a second packet to a second cryptographic processing core 743, and a third packet to a third cryptographic processing core 745. It should be noted that the first, second, and third packets may not be contiguous packets in a secured session, as some other intervening packets of the secured session may have been distributed to other cryptographic processing blocks in the cryptographic accelerator.

In this example, the first, second, and third packets are merely the first, second, and third packets of a particular session received at the packet distribution unit 705. Again, blocking conditions may arise. A cryptographic processing core 745 may complete processing of a third packet before processing of the first packet is completed. The packet convergence unit 707, consequently, is configured to order the packets received from the different cryptographic processing cores. According to various embodiments, techniques of the present invention provide a routing tag attached by a packet distribution unit to the different data sequences to allow a packet convergence unit 707 to properly order the data sequences. Any mechanism used to order cryptographically processed data processed using multiple cryptographic processing cores in a cryptographic processing block is referred to herein as a routing tag.

A packet convergence unit uses the routing tags to order the packets processed by the different cryptographic processing cores. It should be noted that a packet convergence unit 707 uses the routing tag and does not use the load distribution tag. The load distribution tag is referenced by a data routing unit to order packets processed by different cryptographic processing blocks.

It should be noted that the techniques of the present invention recognize that in many cases it is not efficient to simply forward data sequences to cryptography processing cores. In typical implementations, cryptographic processing core blocks are not used. Instead, cryptographic processing cores are arranged directly with input and output interfaces. Cryptographic processing cores are not separated into groups to form cryptographic processing blocks. The techniques of the present invention recognize that it is efficient to organize multiple cores into separate blocks of cores. Consequently, the techniques of the present invention also provide mechanisms for ordering data sent through separate blocks and separate cores within each block.

Figure 8:
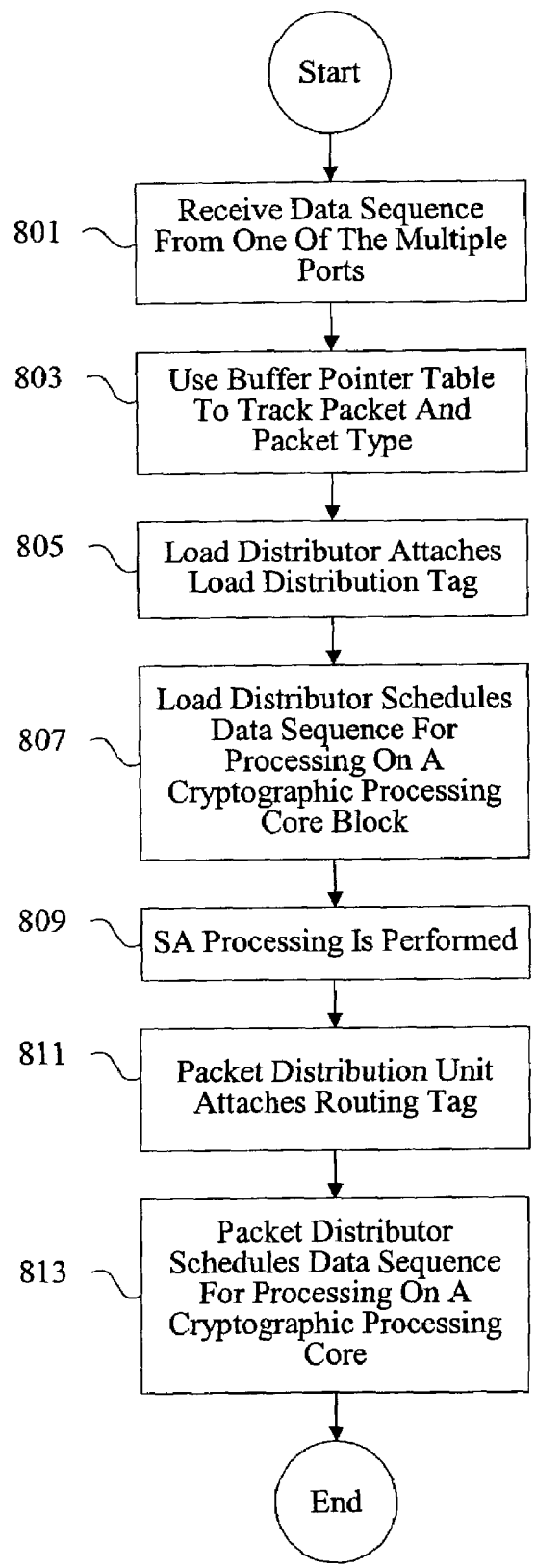
FIG. 8 is a flow process diagram showing packet processing at a load distributor and a packet distributor.

FIG. 8 is a flow process diagram showing one technique for handling packets to maintain packet ordering after the packets are processed by cryptographic processing cores in different cryptographic processing blocks. At 801, a data sequence is received from one of multiple input ports. As noted above, each input port may be configured to handle different types of traffic. At 803, the buffer pointer table can be used to track the packet and the packet type. At 805, the load distributor attaches a load distribution tag to the packet. In some embodiments a load distribution tag is a sequence number associated with traffic in a particular session. At 807, a load distributor schedules the data sequence for processing by one of several cryptographic processing blocks.

In some examples, the load distributor schedules the data sequence for processing by forwarding the data sequence to a target list. The load distributor may select a particular cryptographic processing core block based on load balancing considerations. At 809, security association processing is performed. In some examples, security association information associated with a particular packet is derived. In many instances, the security association information is merged with the data in the packet and a packet distribution unit receives the merged data. The packet distribution unit can then attach a routing tag 811. It should be noted that the routing tag is distinct from the load distribution tag. In many instances, the routing tag is again a sequence number associated with traffic in a particular session. Sessions may be determined using source and destination address information and source and destination port information. At 813, a packet distributor schedules the data sequence for processing on a cryptographic processing core.

Figure 9:
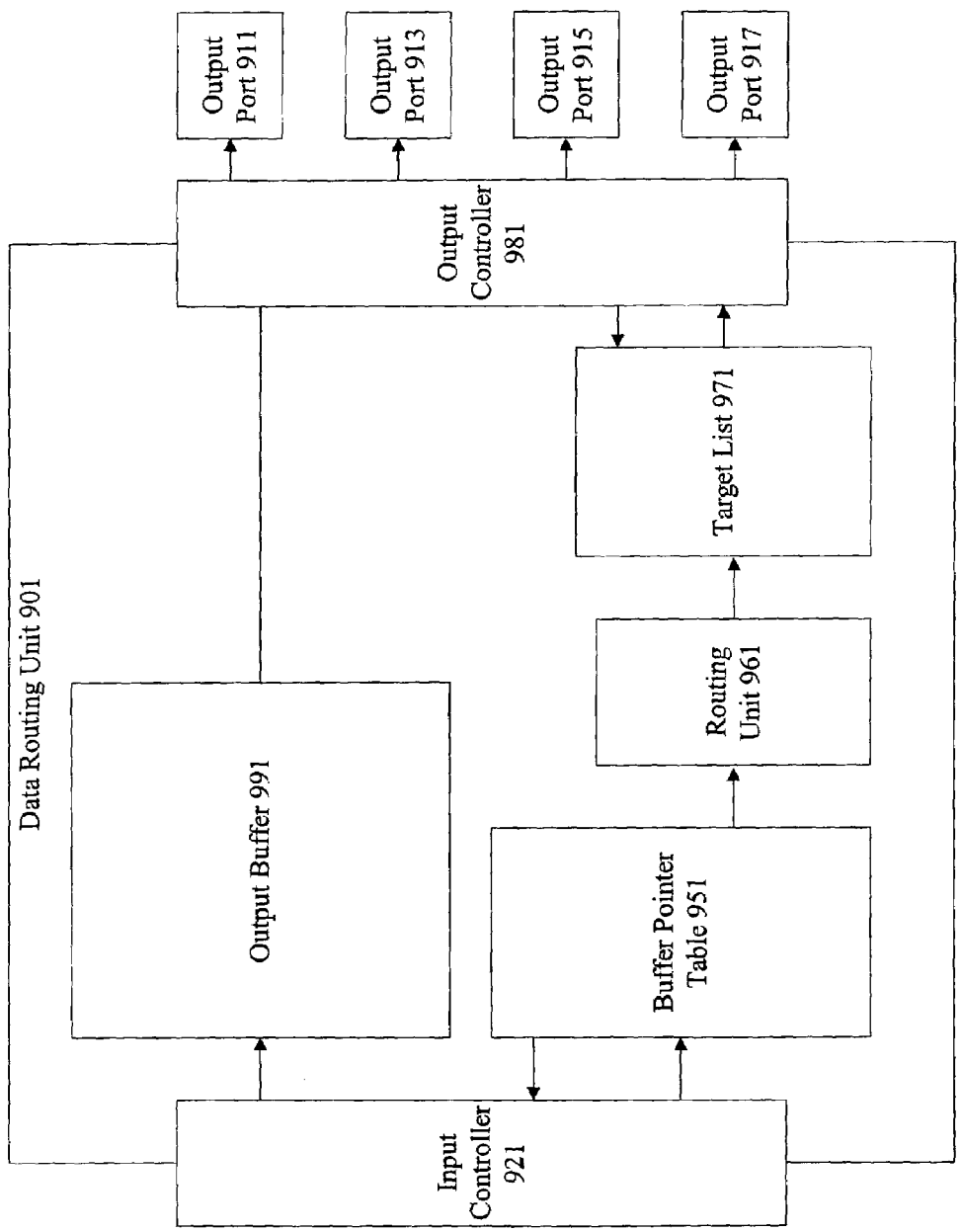
FIG. 9 is a diagrammatic representation showing a data routing unit.

FIG. 9 is a diagrammatic representation of one example of a data routing unit 901 that performs data handling after packets are processed. As noted above, the data input unit provides the input interface for a cryptography accelerator while the data routing unit provides the output interface for the cryptography accelerator. According to various embodiments, the data routing unit manages the ordering of cryptographically processed data for the various egress output ports. The input controller 921 is coupled to a variety of data paths such as bypass, public key processing, and cryptographic core processing data paths. According to various embodiments, data may be received out of order by an input controller as several data paths or several cryptographic processing core blocks may be associated with cryptographic processing cores. For example, packets 1, 2, and 4 may be received from a first cryptographic processing core block and packets 3 and 5 may be received from a second cryptographic processing core block. The data routing unit is configured to order the packets and provide them to the appropriate output port.

According to various embodiments, the input controller 921 writes packets to buffer memory and packet pointers to a buffer pointer table 951 in the order that the input controller receives them. In one example, pointers to packets 1, 2, and 4 may be placed into a first port buffer list while pointers to packets 3 and 5 may be placed in a second port buffer list. A routing unit 961 recognizes the ordering and pulls pointers in order and places the pointers in the target list 971. In many implementations, the target list 971 includes lists of pointers each associated with the various output ports. In one example, lists of pointers are provided in target list 971. In one example, four lists of pointers correspond to output ports 911, 913, 915, and 917. Each pointer in the target list 971 corresponds to a block in output buffer 991. It should be noted that in the data input unit, the pointers in the buffer pointer table are allocable to the various input ports based on the particular needs and requirements of the input ports.

In the data routing unit, however, the pointers in the target list 971 are allocable to the various output ports based upon the needs and requirements of the various output ports. In one example, output port 911 may be configured to support large packets. Consequently, the large number of output buffer memory manager 991 would be allocated to output port 911. In one example, the routing unit 961 would pull a first packet pointer associated with a flow and place the pointer into a buffer list associated with a Gigabit MAC output port. The routing unit 961 would not pull another packet from that particular flow until the second packet pointer is pulled. In this manner, the routing unit 961 can pull data in order from the buffer pointer table even if the data came from different data paths in the cryptographic accelerator.

It should be noted that although the packets on a particular data path will typically be in order because of processing performed using that routing tag at a cryptographic processing core block, the packets received from multiple data paths by the input controller will not necessarily be in order. That is, packets 3 and 5 in a sequence may be received from a cryptographic processing core block before packets 1, 2 and 4 are received from another cryptographic processing core block. The routing unit 961 pulls pointers to data in order from the buffer pointer table and places them in an output port list in the target list 971. The output controller 981 uses the pointers in the target list 971 to identify data in the output buffer 991 to forward to the output ports.

Figure 10:
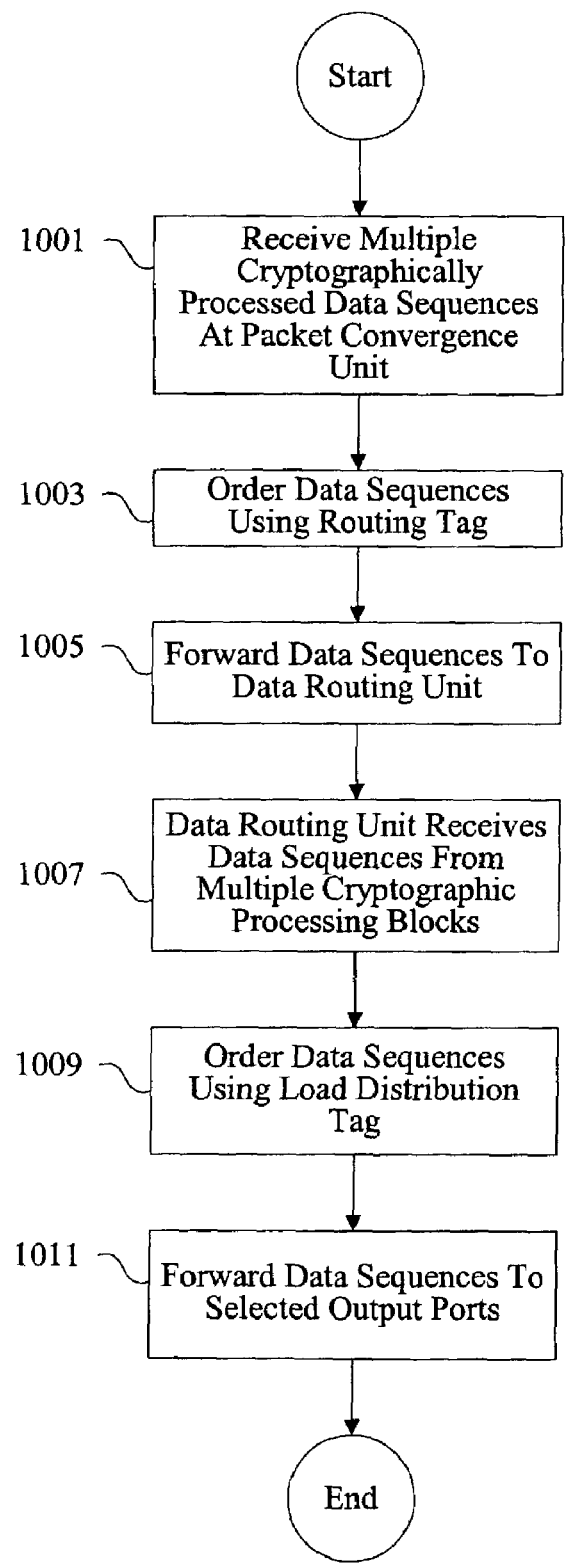
FIG. 10 is a flow process diagram showing packet processing at packet convergence unit and a data routing unit.

FIG. 10 is a flow process diagram showing data handling after packets are processed by cryptographic processing cores. At 1001, multiple cryptographically processed data sequences are received at a packet convergence unit. The packet convergence unit is typically a part of a cryptographic processing core block that also includes a packet distribution unit and multiple cryptographic processing cores. At 1003, the data sequences are placed in order using the routing tag. At 1005, the data sequences are forwarded to the data routing unit. At 1007, the data routing unit receives data sequences from multiple cryptographic processing blocks. Each of the multiple cryptographic processing blocks typically includes packet convergence units for ordering packets processed through the different cryptographic processing cores in each block. At 1009, the data routing unit places the data sequences in order using the load distribution tag. At 1011, the data sequences are forwarded to selected output ports.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for sequencing data in a cryptography accelerator, the method comprising:
   receiving a plurality of data sequences;
   providing the plurality of data sequences with load distribution tags identifying the order in which the plurality of data sequences were received at a load distributor in a cryptography accelerator;
   identifying security association information associated with the plurality of data sequences;
   providing the plurality of data sequences with routing tags identifying the order in which the plurality of data sequences were received at a packet distribution unit; and
   cryptographically processing the plurality of data sequences using a plurality of cryptographic processing cores.

2. The method of claim 1, wherein:
   the load distribution tags comprise a first set of sequence numbers that identify the order in which the data sequences were received at the load distributor; and
   the routing tags comprise a second set of sequence numbers that identify the order in which the data sequences were received at the packet distribution unit.

3. The method of claim 1, comprising using the routing tags to order data sequences output by the plurality of cryptographic processing cores in the same order in which the data sequences were received at the packet distribution unit.

4. The method of claim 1, wherein the plurality of cryptographic processing cores are in a plurality of cryptographic processing blocks, the method comprising:
   providing the plurality of data sequences to the plurality of cryptographic processing blocks; and
   using the load distribution tags to order data sequences output by the plurality of cryptographic processing blocks in the same order in which the data sequences were received at the load distributor.

5. The method of claim 1, comprising:
   using the load distribution tags to maintain the order of the data sequences after using a plurality of cryptographic processing blocks to load balance cryptographic processing of the data sequences; and
   using the routing tags to maintain the order of the data sequences after using the plurality of cryptographic processing cores to load balance cryptographic processing of the data sequences.

6. The method of claim 1, further comprising:
   sequencing the plurality of data sequences using the routing tags.

7. The method of claim 6, further comprising:
   sequencing the plurality of data sequences using the load distribution tags after the plurality of data sequences are sequenced using the routing tags, wherein the routing tags and the load distribution tags allow the ordering of the plurality of data sequences cryptographically processed by a plurality of cryptographic processing blocks each having a plurality of cryptographic processing cores.

8. The method of claim 7, wherein the security association information identifies key and algorithm information used to cryptographically process a data sequence.

9. The method of claim 7, wherein the routing tags are used to sequence data forwarded to a block of cryptographic processing cores.

10. The method of claim 7, wherein the block comprises four cryptographic processing cores.

11. The method of claim 7, wherein the load distribution tags are used to sequence data forwarded to different blocks of cryptographic processing cores.

12. The method of claim 7, wherein the plurality of data sequences are received by a data input unit.

13. The method of claim 12, wherein the data input unit comprises a load distribution unit.

14. The method of claim 13, wherein the load distribution unit assigns load distribution tags.

15. The method of claim 14, wherein the data input unit further comprises a buffer shared by a plurality of input ports.

16. A cryptography accelerator, comprising:
   a data input unit configured to receive data sequences from an external entity;

a first cryptographic processing block, the first cryptographic processing block comprising a first plurality of cryptographic processing cores;

a second cryptographic processing block, the second cryptographic processing block comprising a second plurality of cryptographic processing cores;

a first packet convergence unit associated with the first cryptographic processing block, the first packet convergence unit configured to arrange in order data sequences processed by the first plurality of cryptographic processing cores; and a data routing unit configured to arrange in order data sequences from the first and second cryptographic processing blocks.

17. The cryptographic accelerator of claim 16, wherein:

the data routing unit uses load distribution tags to maintain the order of the data sequences after the cryptographic processing blocks are used to load balance cryptographic processing of the data sequences; and the first packet convergence unit uses routing tags to maintain the order of the data sequences after the first plurality of cryptographic processing cores are used to load balance cryptographic processing of the data sequences.

18. The cryptographic accelerator of claim 16, further comprising a second packet convergence unit associated with the second cryptographic processing block, the second packet convergence unit configured to arrange in order data sequences processed by the second plurality of cryptographic processing cores.

19. The cryptographic accelerator of claim 18, wherein the first packet convergence unit arranges processed data sequences in order by referencing routing tags.

20. The cryptographic accelerator of claim 19, wherein the second packet convergence unit arranges processed data sequences in order by referencing routing tags.

21. The cryptographic accelerator of claim 20, wherein the data routing unit arranges processed data sequences in order by referencing load distribution tags.

22. The cryptographic accelerator of claim 21, wherein the data routing unit comprises a plurality of output ports.

23. The cryptographic accelerator of claim 16, wherein the external entity is a CPU.

24. The cryptographic accelerator of claim 16, wherein the data input unit comprises a plurality of input ports.

25. The cryptographic accelerator of claim 16, further comprising a third cryptographic processing block, the third cryptographic processing block comprising a third plurality of cryptographic processing cores.

26. The cryptographic accelerator of claim 25, further comprising a fourth cryptographic processing block, the fourth cryptographic processing block comprising a fourth plurality of cryptographic processing cores.

27. The cryptographic accelerator of claim 16, wherein the data input unit comprises a load distribution unit configured to distribute data sequences to the cryptographic processing blocks.

28. The cryptographic accelerator of claim 27, wherein:

the data input unit associates load distribution tags with the data sequences, the load distribution tags comprising a set of sequence numbers that identify the order in which the data sequences were received at the load distribution unit; and the data routing unit uses the load distribution tags to order data sequences output by the cryptographic processing blocks in the same order in which the data sequences were received at the load distribution unit.

29. The cryptographic accelerator of claim 27, wherein the first cryptographic processing block comprises a packet distribution unit configured to distribute data sequences to one of the first plurality of cryptographic processing cores.

30. The cryptographic accelerator of claim 29, wherein:

the packet distribution unit associates routing tags with the data sequences, the routing tags comprising a set of sequence numbers that identify the order in which the data sequences were received at the packet distribution unit; and the first packet convergence unit uses the routing tags to order data sequences output by the first plurality of cryptographic processing cores in the same order in which the data sequences were received at the packet distribution unit.

31. An apparatus for sequencing data in a cryptography accelerator, the apparatus comprising:

means for receiving a plurality of data sequences;

means for providing the plurality of data sequences with load distribution tags identifying the order in which the plurality of data sequences were received at a load distributor in a cryptography accelerator;

means for identifying security association information associated with the plurality of data sequences;

means for providing the plurality of data sequences with routing tags identifying the order in which the plurality of data sequences were received at a packet distribution unit; and means for cryptographically processing the plurality of data sequences using a plurality of cryptographic processing cores.

32. The apparatus of claim 31, further comprising:

means for sequencing the plurality of data sequences using the routing tags.

33. The apparatus of claim 32, further comprising:

means for sequencing the plurality of data sequences using the load distribution tags after the plurality of data sequences are sequenced using the routing tags, wherein the routing tags and the load distribution tags allow the ordering of the plurality of data sequences cryptographically processed by a plurality of cryptographic processing blocks each having a plurality of cryptographic processing cores.

* * * * *